United States Patent [19]

Anzai et al.

[11] Patent Number: 4,923,520
[45] Date of Patent: May 8, 1990

[54] SPHERICAL FUSED SILICA AND ITS USE IN FILLERS AND RESIN COMPOSITIONS

[75] Inventors: Kenji Anzai, Kobe; Tatsuo Hamabe, Osaka, both of Japan

[73] Assignee: Ciba-Geigy Corporation, Ardsley, N.Y.

[21] Appl. No.: 251,995

[22] Filed: Sep. 30, 1988

Related U.S. Application Data

[63] Continuation of Ser. No. 178,802, Mar. 29, 1988, abandoned, which is a continuation of Ser. No. 829,853, Feb. 14, 1986, abandoned, which is a continuation of Ser. No. 631,290, Jul. 16, 1984, abandoned.

[30] Foreign Application Priority Data

Jul. 26, 1983 [GB] United Kingdom ............... 8320086

[51] Int. Cl.$^5$ ............................................. C04B 14/04
[52] U.S. Cl. ............................... 106/490; 106/287.34
[58] Field of Search ........................... 106/287.34, 490

[56] References Cited

U.S. PATENT DOCUMENTS

| | | | |
|---|---|---|---|
| 3,658,750 | 4/1972 | Tsukoi et al. | 260/38 |
| 3,769,126 | 10/1973 | Koleck | 156/172 |
| 3,845,006 | 10/1974 | Erneta | 106/287.34 |
| 4,042,550 | 8/1977 | Tuller et al. | 260/280 |
| 4,476,258 | 10/1984 | Hiles | 532/212 |

FOREIGN PATENT DOCUMENTS

| | | |
|---|---|---|
| 844038 | 6/1970 | Canada . |
| 857955 | 12/1970 | Canada . |
| 989533 | 5/1976 | Canada . |
| 1174391 | 9/1984 | Canada . |
| 1213699 | 11/1986 | Canada . |
| 0121396 | 3/1984 | European Pat. Off. . |
| 121396 | 10/1984 | European Pat. Off. . |
| 2721294 | 1/1978 | Fed. Rep. of Germany . |
| 2748523 | 5/1979 | Fed. Rep. of Germany . |
| 2836057 | 3/1980 | Fed. Rep. of Germany . |
| 47-47575 | 11/1972 | Japan . |
| 53-102361 | 9/1978 | Japan . |
| 58-15260 | 1/1983 | Japan . |
| 58-17161 | 2/1983 | Japan . |
| 58-138740 | 8/1983 | Japan . |
| 58-219242 | 12/1983 | Japan . |
| 956363 | 11/1960 | United Kingdom . |
| 2029420 | 3/1980 | United Kingdom . |

OTHER PUBLICATIONS

SPE Journal, Sep. 1969–vol. 25, Spherical Glass Fillers, Otto R. Strauch.
Ullmanns Encyklopadie der Technischen Chemie, vol. 24, pp. 560–561.
K. Hiragushi et al, Yogyo-Kyokai Shi, 90(3), 105 (1982).

*Primary Examiner*—Amelia Burgess Yarbrough
*Attorney, Agent, or Firm*—Harry Falber

[57] ABSTRACT

Spherical fused silica with an average particle diameter within the range of 10 to 50 $\mu$m and having a particle size distribution of 1 to 100 $\mu$m in diameter is a useful filler for resin compositions having improved mechanical and electrical properties as well as good flowability and low viscosity. The spherical fused silica is preferably treated on its surface with a silane coupling agent. Resin compositions containing said spherical fused silica as the major filler are particularly useful as casting materials.

11 Claims, No Drawings

SPHERICAL FUSED SILICA AND ITS USE IN FILLERS AND RESIN COMPOSITIONS

This is a continuation of SN 07/178,802, filed 03/29/88, now abandoned; which is a continuation of SN 06/829,853, filed 02/14/86, now abandoned; which is a continuation of SN 06/631,290 filed 07/16/84, now abandoned.

The present invention relates to spherical fused silica with an average particle diameter within the range of 10 to 50 μm and having a particle size distribution of 1 to 100 μm in diameter, the surface of which spherical fused silica may be treated with a silane coupling agent, to a filler for resins comprising said spherical fused silica, and to resin compositions containing said spherical fused silica as the major filler.

Crystalline or fused silica powders have found widespread use as fillers which reduce the coefficients of the linear thermal expansion, increase the thermal conductivity, improve the cracking resistance of the cured products and decrease the reaction heat of epoxy resins and other resin compositions. However, they are not quite satisfactory as fillers for moulding compositions of good processability which yield high-quality products of adequate mechanical and electrical properties.

Known spherical inorganic fillers such as glass beads do not provide sufficient mechanical strength. Spherical alumina, on the other hand, is not considered appropriate for producing cured products of homogeneous quality because of its tendency to sedimentate in the cured resin products due to its high specific gravity. Neither of these spherical fillers is thus free from shortcomings. Therefore, a need for improved fillers is felt.

The term "moulding" employed here and in the following encompasses all kinds of resin processing such as casting, potting and moulding processes, casting processes being particularly preferred. Through a series of tests it was found that resin compositions containing spherical fused silica with an average particle diameter of 10 to 50 μm and having a particle size distribution of 1 to 100 μm in diameter, as compared with compositions containing crystalline or non-crystalline silica powders, exhibit markedly improved flowability and excellent de-gassing properties because of their low viscosity. Cured products derived therefrom are uniform in quality and exhibit excellent electrical and mechanical properties.

The average particle diameter of the spherical fused silica of the present invention may vary within the stated limits depending on the intended use, the resin to be filled therewith, the shaped articles aimed at, the processing methods employed and the like. Use of spherical fused silica with extremely small diameter would be detrimental to the processability of resin compositions containing such spherical fused silica as the major filler in that it increases the viscosity to such an extent that high pressure is needed for the processing. Vice-versa, extremely large average particle diameters would cause the spherical fused silica to sedimentate during curing of the resin product, and are therefore undesirable.

The spherical fused silica according to the present invention is suitable for use in various resins such as epoxy resins, phenolic resins, polyester resins and polyurethane resins, copolymers of such resins or mixtures of such resins. It is particularly suitable as filler for epoxy resins. Spherical fused silica having an average particle diameter of 15 to 40 μm is preferred.

Suitable epoxy resins are, e.g., the optionally advanced diglycidyl ethers of divalent phenols such 2,2-bis(4-hydroxyphenyl)propane (Bisphenol A), 2,2-bis(3,5-dibromo-4-hydroxyphenyl)propane (tetrabromo-Bisphenol A) and bis(4-hydroxyphenyl)methane (Bisphenol F), of divalent aliphatic alcohols having up to 4 carbon atoms such as butane-1,4-diol, or of novolacs, especially phenol-formaldehyde and cresol-formaldehyde novolacs, as well as N,N'-tetraglycidyl-4,4'-diaminodiphenylmethane. Epoxy resins based on bisphenol A and phenol or cresol novolac epoxy resins are preferred.

The shaped articles obtained from resin compositions containing the spherical fused silica of this invention exhibit excellent electrical and mechanical properties. The said compositions may therefore be employed for different purposes, e.g. as casting materials, moulding materials, adhesives, tooling resins, or resins for civil engineering and construction uses. Use as casting materials is preferred.

When the spherical fused silica of the present invention, preferably spherical fused silica having an average particle diameter of 15 to 40 μm, is used as the major filler for epoxy resin compositions, the resultant compositions exhibit enough flowability to be poured into moulds by the force of gravity alone, either at atmospheric pressure or under vacuum. Resin compositions containing spherical fused silica as defined are further characterized by their markedly low viscosity as compared with resin compositions containing the same amount of known crystalline or fused silica powder as filler. Adequate selection of the particle size of the spherical fused silica permits reduction of the viscosity up to 50%. This makes is possible to employ larger amounts of filler for obtaining compositions of the same given viscosity, thereby achieving shaped products exhibiting decreased coefficients of linear thermal expansion without affecting the processability of the resin compositions. The products obtained from the resin compositions of this invention are further distinguished by substantially improved mechanical properties such as flexural strength over resin compositions containing silica powders as the main filler. The products obtained therefrom also exhibit improved electric insulation, a lower dielectric loss factor and dielectric constant when compared with resin compositions containing crystalline silica powder as the main filler. They also have improved mechanical strength as compared to products obtained from compositions containing spherical glass beads as filler. The spherical fused silica of the present invention further does not give rise to sedimentation problems as opposed to spherical alumina, and it yields homogeneous products of excellent mechanical and electrical properties.

The amount of spherical fused silica to be employed depends on the type of resin and optional additives, such as hardeners or other additives used as well as on the target product. In the cse of epoxy resin compositions comprising resin, hardener and other additives, the amount of spherical fused silica is preferably between 20 and 80 percent by weight, more particularly between 50 and 70 percent by weight, based on the total weight of the composition.

Spherical fused silica treated with a silane coupling agent, when used as a main filler in resin compositions, will provide a marked improvement in resistance to moisture and humidity of the cured product. This results in a considerable improvement in mechanical strength and electrical properties of the cured product after exposure to moisture and humidity.

Any type of known silane coupling agent may be used, such as β-(3,4-epoxycyclohexyl)ethyl-trimethoxysilane and, in particular, γ-glycidyloxy-propyl-trimethoxysilane. The silane coupling agent is generally added in amounts of from about 0.1 to 1.0 parts by weight, based on 100 parts by weight of the spherical fused silica.

The treatment of the spherical fused silica with the silane coupling agent may be carried out in a conventional manner, e.g. by dry-blending of the silane coupling agent and spherical fused silica, or by a slurry process, e.g. by mixing the spherical fused silica in an aqueous solution of the silane and drying the slurry by heating.

The resin compositions according to the invention contain the spherical fused silica as the main filler. They may, however, also contain other fillers usually employed in this specific technical field such as glass fibres, carbon fibres, mica, graphite, calcium carbonate, talc, kaolin, colloidal silica dioxide, metal powders, and the like.

The resin compositions may also contain hardeners, curing accelerators, diluents, plasticizers, pigments, mould release agents, flame retardants and other additives usually employed in this particular technical field.

The spherical fused silica of the present invention may be prepared in a manner analogous to that employed for manufacturing spherical silicate, spherical alumina, spherical chromite (chrome iron ore), and spherical zirconium, e.g. by flame-spraying crystalline silica powder the particle size of which has advantageously been adjusted to the proper size by grinding or crushing. Suitable carrier gases are oxygen and nitrogen. Conveniently, acetylene/oxygen or, more particularly, propane/oxygen flames are employed in this process. In a preferred embodiment the crystalline silica is heated up to not less than 1900° C., preferably between 2000° and 2200° C., flame-sprayed into the furnace, and the particles formed are collected in a tank inside a water-cooled vessel.

The average particle diameter and particle size distribution of the spherical fused silica obtained by flame-spraying approximate those of the crystalline silica powder used as starting material. Preferably, the average particle diameter of the crystalline silica powder is about 2 to 10% higher than that of the spherical fused silica to be prepared therefrom. Spherical fused silica of optimum spherical shape may be obtained by suitably adjusting the propane/oxygen ratio and the powder concentration in the flame (amount of powder/amount of propane).

The crystalline silica powder employed should preferably be of high purity, e.g. not less than 99.5 percent $SiO_2$.

Flame-spraying is considered suitable for producing the spherical fused silica of this invention, though the yield of spherical fused silica drops when fused silica having an average particle dimeter of less than 10 μm is to be produced. Vice-versa, the proportions of particles that are not fully fused, e.g. which do not become non-crystalline throughout, or which are not fully spherical in shape, increase when fused silica having an average particle diameter above 50 μm is to be produced.

The present invention is described in more detail in the following Examples. It is to be noted, hoever, that the subject of the invention is not limited by said Examples.

MANUFACTURING EXAMPLE

Crystalline silica powder having an average particle diameter of 27 μm and an $SiO_2$ content of not less than 99.5 percent (obtained by crushing in a ball mill) is fed from the hopper, transported by oxygen gas and then flame-sprayed horizontally from the burner of the flame-spraying device into the furnace. The walls of the furnace are cooled by water. The crystalline silica is momentarily fused in the oxygen/propane flame at a temperature of 2000° C., the volume flow ratio of propane to oxygen being kept at 1:5. Finally, the spherical fused silica obtained is collected in a tank located in a water-cooled container.

The average particle diameter of the particles thus collected is 25 μm. Close observation by a light microscope reveals that more than 99 percent are in perfect spherical form with a high degree of transparency. The presence of almost perfectly fused non-crystalline silica is confirmed at the same time by X-ray diffraction. Use of crystalline silica powder with an average particle diameter of 34 μm under the same conditions yields spherical fused silica having an average particle diameter of 33 μm.

For determining the particle size distribution of the powder particles (starting material) and the spherical fused silica particles, sieves of 100, 200 and 300 mesh are stacked one on top of the other, the sieve with the biggest apertures being topmost. A 20 g test sample is placed on the topmost sifter. The particle size distribution of particles of over 46 μm is obtained by having the sample flushed with water, transferring the residues one after the other onto an evaporating dish and measuring the weight of the residues in the respective sifters after drying. The particle size distribution of particles of less than 20 μm is determined by means of an automatic measuring device (Shimazu Automatic Particle Size Distribution Measurer, Model RS-1000). Cumulative percentages of the single particle sizes for the particle size distribution values measured are plotted out on a graph, particle size distribution curves being drawn. The particle diameter for a cumulative percentage of 50 is taken as the average particle diameter.

EXAMPLES 1 TO 3

Casting resin compositions are obtained by mixing 100 parts by weight (pbw) of ARALDITE CY 230) (a formulated bisphenol A type epoxy resin having an epoxy content of 4.3 to 4.8 equivalents/kg and a viscosity at 25° C. of 1000 to 2000 mPa s, of Ciba-Geigy Ltd.), 20 pbw of hardener HY 956 (a formulated aliphatic polyamine hardener of Ciba-Geigy Ltd.), and 120 pbw of spherical fused silica of the various average particle diameters shown in Table 1. Mixing of each resin system is effected for 10 minutes under vacuum of less than 1330 Pa.

Measurement of viscosity

The viscosity of each resin system is measured at 25° C. The results are shown in Table 1. The viscosity is measured with a B-type viscometer of Tokyo Keiki Ltd., Japan, at a rotation speed of 20 revolutions per minute, using spindle No. 2.

TABLE 1

| Example | Average particle diameter (μm) of spherical fused silica | Viscosity at 25° C. (mPa s) |
|---|---|---|
| 1 | 15.3 | 7820 |
| 2 | 25.0 | 3520 |
| 3 | 34.8 | 3850 |

Measurement of flexural strength

The resin composition of Example 2 is mixed under vacuum and cured for 24 hours at 25° C. and 8 hours at 60° C. to give 5 test pieces of 60×10×4 mm in dimension. The flexural strength of these five test pieces is measured using an Instron Universal Tester, Model 1125, according to VSM Standard 77103 (VSM=Verein Schweizerischer Maschinenindustrieller). The average flexural strength of the five test pieces is 93 N/mm².

EXAMPLE 4

An epoxy resin composition which comprises 100 pbw of ARALDITE GY 260 (a bisphenol A type epoxy resin having an epoxy equivalent weight of 180 to 200 g equivalent and a viscosity at 25° C. of 12000 to 16000 mPa s, of Ciba-Geigy Ltd.), 32 pbw of Hardener HY 932 (a formulated aromatic polyamine hardener of Ciba-Geigy Ltd.) and 198 pbw of spherical fused silica of an average particle diameter of 25 μm is mixed for 10 minutes and de-gassed under vacuum. The mixture is then poured into a vertically held test tube of 18 mm in diameter, to a level of 140 mm from the bottom of the test tube, and cured for 10 hours at 80° C. After release of the cured specimen from the mould, three disc-shaped test pieces of 3 mm thickness are cut out the test specimen, more particularly at 6 mm (upper part), at 70 mm (middle part) and 130 mm (lower part) from the top of the test specimen. The initial weight of each test piece is measured and the test pieces are then baked in a crucible at 600° C. for 2 hours in order to determine the weight of the filler contained in each test piece. The degree of sedimentation is defined by the difference of the filler content in each test piece. The filler content is 59.4% for the upper part, 60.0% for the middle part and 61.2% for the lower part. This means that a very homogeneous casting is obtained from the epoxy resin composition of this example. In fact, very little sedimentation occurs considering that the initial weight percentage of filler in the composition is 60%.

EXAMPLES 5 TO 10

Epoxy resin, hardener and filler are mixed in accordance with the mixing ratios given in Table 2, and cured. In these examples the epoxy resins, hardeners and fillers are pre-heated to 80° C. before mixing, and then mixed for 10 minutes, de-gassed under vacuum and cast into metal moulds for the flexural strength and electrical property tests, the moulds being pre-heated to 80° C. before casting. The resin systems are de-gassed again under vacuum and cured under the conditions given in Table 2.

TABLE 2

| Composition and curing conditions | Mixing ratio (parts by weight) | | | | | |
|---|---|---|---|---|---|---|
| | Ex. 5 | Ex. 6 | Ex. 7 | Ex. 8 | Ex. 9 | Ex. 10 |
| ARALDITE GY 260 (1) | 100 | 100 | — | — | — | — |
| ARALDITE CY 225 (2) | — | — | 100 | 100 | — | — |
| diglycidyl ester of hexahdrophthalic anhydride (3) | — | — | — | — | 100 | 100 |
| Hardener HY 932 (4) | 32 | 32 | — | — | — | — |
| Hardener HY 225 (5) | — | — | 80 | 80 | — | — |
| hexahydrophthalic anhydride (hardener) | — | — | — | — | 90 | 90 |
| Accelerator DY 071 (6) | — | — | — | — | 1 | 1 |
| Spherical fused silica of Example 2 | 198 | — | 270 | — | 300 | — |
| Spherical fused silica of Example 2 treated with γ-glycidyloxy-propyl-tri-methoxy silane (7) | — | 198 | — | 270 | — | 300 |

Curing conditions: for Examples 5 and 6: 80° C./6 hours and 100° C./5 hours; for Examples 7 and 8: 80° C./6 hours and 130° C./10 hours; for Examples 9 and 10: 80° C./6 hours and 140° C./10 hours (1) bisphenol A type epoxy resin, epoxy equivalent weight 180-200 g equivalent, viscosity at 25° C. = 12000-16000 mPa s
(2) formulated bisphenol A type epoxy resin, epoxy equivalent weight 178-196 g/equivalent, viscosity at 25° C. = 10000-15000 mPa s
(3) epoxy equivalent weight 158-182 g/equivalent, viscosity at 25° C. = 700-1000 mPa s
(4) formulated aromatic polyamine hardener
(5) formulated acid anhydride hardener
(6) Accelerator based on organometallic complex
(1) to (6) are products of Ciba-Geigy Ltd.
(7) The treatment of the spherical fused silica of Example 2 with γ-glycidyloxy-propyl-trimethoxysilane is carried out as follows: 5 g of γ-glycidyloxy-propyl-trimethoxysilane are mixed with 500 g of distilled water and dispersed well. The resultant solution is added to 1 kg of spherical fused silica while stirring. The filler is mixed with the silane solution for 30 minutes and then transferred onto a pan made of stainless steel before drying at 110° C. for 16 hours. The filler obtained after drying is then transferred into an electric juicing machine and mixed to eliminate flocculation before use.

Testing of cured products

Water absorption, flexural strength according to VSM 77103 and electrical properties, i.e. dielectric loss factor (tan δ), dielectric constant ε and volume resistivity according to VDE 0303 (Verband Deutscher Elektrotechniker) are tested using the cured test pieces of Examples 5-10.

The test specimens for the water absorption are 60×10×4 mm in dimension, their surface being smoothly polished with sand paper No. 1000. The water absorption is expressed as the average weight increase in % of 5 test pieces after 1, 2 and 3 hours of boiling, respectively. The test pieces for the flexural strength are 60×10×4 mm in dimension, their surface being smoothly polished with sand paper No. 1000. The flexural strength is tested on five test pieces; the initial values and the values after 1, 2 and 3 hours boiling being determined by means of an Instron Universal tester, Model 1125. Thereafter the average strength for 5 test pieces is calculated. Table 3 shows the average values for water absorption and flexural strength of the compositions of Examples 5-10.

TABLE 3

| Example | Water absorption (%) after boiling | | | Flexural strength (N/mm²) initial and after boiling | | | |
|---|---|---|---|---|---|---|---|
| | 1 hour | 2 hours | 3 hours | initial | 1 hour | 2 hours | 3 hours |
| 5 | 0.07 | 0.12 | 0.15 | 108 | 83 | 80 | 78 |
| 6 | 0.09 | 0.13 | 0.16 | 138 | 125 | 117 | 114 |
| 7 | 0.08 | 0.17 | 0.21 | 146 | 76 | 69 | 62 |
| 8 | 0.10 | 0.18 | 0.20 | 140 | 138 | 135 | 137 |
| 9 | 0.07 | 0.15 | 0.17 | 154 | 82 | 70 | 65 |
| 10 | 0.05 | 0.12 | 0.14 | 150 | 146 | 143 | 140 |

The test pieces for determining the electrical properties, i.e. loss factor tan δ, dielectric constant ε and volume resistivity, are 100×100×2 mm in dimension, their surface being smoothly polished with sand paper No. 1000. Four test pieces are prepared for each of Examples 5-10. Two of them are used for the measurement of the loss factor tan δ and the dielectric constant ε and two are used for determining the volume resistivity. The above electrical properties are measured on the initial test pieces and on a test piece after one hour of boiling. The loss factor tan δ and the dielectric constant ε are measured at 50 Hz at 25° C. by means of a Type TR-10C Dielectric Property Tester of Ando Electric Ltd., Japan. The volume resistivity is measured at 50 Hz at 25° C. by a type TR-43C Volume Resistivity Tester of Takeda Riken Ltd., Japan, at direct current 500 V. Table 4 shows the average values of the test results from two test pieces.

TABLE 4

| Example | Loss factor tan δ % initial | Loss factor tan δ % after 1 h boiling | Dielectric constant ε initial | Dielectric constant ε after 1 h boiling | volume resistivity (ohm.cm) initial | volume resistivity (ohm.cm) after 1 h boiling |
|---|---|---|---|---|---|---|
| 5 | 0.32 | 0.72 | 3.89 | 4.12 | $1.21 \times 10^{16}$ | $1.01 \times 10^{16}$ |
| 6 | 0.37 | 0.56 | 3.65 | 3.75 | $1.21 \times 10^{16}$ | $6.50 \times 10^{15}$ |
| 7 | 0.34 | 3.52 | 3.56 | 4.33 | $1.52 \times 10^{16}$ | $1.05 \times 10^{16}$ |
| 8 | 0.33 | 1.67* | 3.52 | 3.42 | $1.38 \times 10^{16}$ | $5.51 \times 10^{15}$ |
| 9 | 0.55 | 1.79 | 3.46 | 3.68 | $5.25 \times 10^{15}$ | $4.09 \times 10^{15}$ |
| 10 | 0.54 | 0.56 | 3.53 | 3.65 | $2.87 \times 10^{15}$ | $3.27 \times 10^{15}$ |

*after 3 hours in boiling water.

EXAMPLE 11

100 pbw of a cresol novolac epoxy resin with an epoxy equivalent weight of 220 g/equivalent and a softening point of 71° C., 50 pbw of a phenol novolac with a hydroxyl group equivalent weight of 105 (g/equivalent) and a softening point of 70° C., 1 pbw of 2-methylimidazole, 3 pbw of carnauba wax, 0.5 pbw of carbon black and 350 pbw of the spherical fused silica of Example 2 are blended and mixed well in a two-roller mill which is heated to approximately 90° C. The mixture is taken out in wheet form, cooled and crushed into fine granules. The granules thus obtained can be used as transfer moulding material for electronic components, using for example a low pressure transfer moulding machine, at a mould temperature of 170° to 180° C. and a moulding pressure of 600-800 N/cm².

The suitability of resin compositions containing spherical fused silica of the present invention as casting material is tested as follows:

Flowability under normal pressure 100 pbw ARALDITE CY 205 (a liquid unmodified bisphenol A epoxy resin having an epoxy equivalent weight of 182-196 g/equivalents and a viscosity at 25° C. of 9000-13000 mPa s, of Ciba-Geigy Ltd.), 100 pbw of Hardener HY 905 (a modified anhydride hardener of Ciba-Geigy Ltd.) and 400 and 350 pbw, respectively, of spherical fused silica are mixed. 180 g of the resultant resin mixture are pre-heated in a hot-air circulating oven at 60° C. for 1 hour and are then placed in a 100 cc polypropylene cup having a hole of 3 mm at the bottom (diameter 45 mm, height 75 mm). In order to determine the influence of the filler on the flowability of the resin composition, the time required for 30 g of resin mixture to drop through the hole in the cup bottom, after the first 10 g of the mixture have passed through, is determined by means of a digital balance. The results are summarized below.

| | time required for 30 g of resin composition to drop through hole in cup bottom | viscosity at 25° C. |
|---|---|---|
| with 400 pbw of silica according to Example 2 | 246 seconds | 25000 mPa s |
| with 350 pbw of silica according to Example 2 | 131 seconds | 18100 mPa s |

Degassing properties 250 g of a resin mixture consisting of 100 pbw of ARALDITE CY 205, 100 pbw of Hardener HY 905 and 350 pbw of the spherical fused silica according to Example 2 and 350 pbw of the silane-treated spherical fused silica of Example 6, respectively, are placed in a tin can (diameter 73 mm, height 350 mm) and pre-heated for 1 hour in a hot-air circulating oven at 60° C. The mixture is then taken out and placed in a vacuum tank at 22° C. to degas under vacuum. The surface of the resin mixture raises by reducing pressure and eventually drops by degassing. The time required to degas, i.e. from the beginning of reducing the pressure in the tank to the time when the risen surface of the resin mixture drops by degassing, and the difference of the height of the surface before reducing pressure and the surface height at degassing are measured. The viscosity of the samples is determined by the method described in Examples 1-3. The results are summarized below.

| | Degassing time (seconds) | height of the risen surface (cm) | viscosity at 25° C. mPa s |
|---|---|---|---|
| with silica according to Example 2 | 432 | 17.5 | 18080 |
| with silane-treated silica according to Example 6 | 292 | 13.0 | *29600 |

The resin compositions containing spherical fused silica according to the invention are thus distinguished by good flowability and good degassing properties. Due to this good flowability the resin compositions according to the invention are particularly suitable for use as casting materials of excellent processability. Furthermore, it is surprising that the resin composition containing the spherical fused silica treated with a silane coupling agent shown markedly improved degassing properties (shorter degassing time) as compared to the resin composition containing untreated spherical fused silica, even though the viscosity of the former is considerably higher.

We claim:

1. Particulate fused silica having a silica dioxide content of at least 99.5% and a particle diameter distribution of from 1 to 100 μm with the average particle diameter being from 10 to 50 μm, at least 99% of the particles being substantially perfect spheres.

2. Particulate fused silica according to claim 1 wherein the average particle diameter is from 15 to 40 μm.

3. Particulate fused silica according to claim 1 wherein the surface is treated with a silane coupling agent.

4. Particulate fused silica according to claim 3 wherein the silane coupling agent is beta-(3,4-epoxycyclohexyl)-ethyl-trimethoxysilane.

5. Particulate fused silica according to claim 3 wherein the silane coupling agent is gamma-glycidyloxypropyltrimethoxysilane.

6. An epoxy resin composition which comprises at least one epoxy resin and from 20% to 80% by weight based on the total weight of the composition, of particulate fused silica according to claim 1.

7. Resin composition as claimed in claim 6 wherein the silane coupling agent is γ-glycidyloxy-propyl-trimethoxysilane.

8. An epoxy resin composition according to claim 6 wherein the average particle diameter of the particulate fused silica is from 15 to 40 μm.

9. An epoxy resin composition according to claim 6 wherein the surface of the particulate fused silica is treated with a silane coupling agent.

10. An epoxy resin composition according to claim 9 wherein the silane coupling agent is beta-(3,4-epoxycyclohexyl)-ethyl-trimethoxysilane.

11. An epoxy resin composition according to claim 9 wherein the silane coupling agent is gamma-glycidyloxypropyltrimethoxysilane.

* * * * *